(12) United States Patent
Baentsch et al.

(10) Patent No.: US 6,272,607 B1
(45) Date of Patent: Aug. 7, 2001

(54) METHOD AND APPARATUS FOR TRANSACTIONAL WRITING OF DATA INTO A PERSISTENT MEMORY

(75) Inventors: Michael Baentsch, Langnau; Peter Buhler, Thalwil; Thomas Eirich, Au; Frank Hoering; Marcus Oestreicher, both of Zurich, all of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/382,100

(22) Filed: Aug. 24, 1999

(30) Foreign Application Priority Data

Aug. 28, 1998 (EP) .................................................. 98116374

(51) Int. Cl.$^7$ ...................................................... G06F 12/16
(52) U.S. Cl. ........................ 711/162; 711/103; 711/165; 235/492
(58) Field of Search ............................ 235/492; 711/103, 711/161, 162, 165

(56) References Cited

U.S. PATENT DOCUMENTS 5,706,504 * 1/1998 Atkinson et al. ..................... 707/100
6,068,192 * 5/2000 McCabe et al. ...................... 235/492

* cited by examiner

Primary Examiner—Jack A. Lane
(74) Attorney, Agent, or Firm—Louis Hertzberg

(57) ABSTRACT

A method for transactional writing of data into a data space in a persistent memory. The data space has a data space header which signals that the data space is free. A data header is generated when there is a writing transaction in the data space. After successful completion of the transactional writing, the data header signals that the data space is occupied by the written data. The data is written directly to the persistent memory, and in the case the transactional writing is not successfully completed, the data space header is valid for the data space. If the transactional writing is successfully completed, the data header is valid for the written data in the data space. A persistent buffer serves for storing validity information for ensuring the validity of the data header or the data space header as appropriate.

27 Claims, 1 Drawing Sheet

METHOD AND APPARATUS FOR TRANSACTIONAL WRITING OF DATA INTO A PERSISTENT MEMORY

TECHNICAL FIELD

The present invention relates to transaction support in computer systems with constrained resources. More specifically, the present invention relates to the minimization of the amount of memory and the number of write-operations required for transaction support in a resource-constrained environment such as a smartcard, particularly a smartcard such as a Javacard offering a Java environment.

BACKGROUND OF THE INVENTION

A number of problems exist in smartcards that are to be updated after they have been issued to the customer. In such smartcards, the computing time, communication bandwidth, and transient memory (RAM) are limited. In addition, writing to persistent memory is much more expensive than writing to temporary memory, and finally no assumptions about the integrity of the communications infrastructure can be made.

One problem that exists is the overall time required to load code and linkage information into the smartcard, perform cryptographic decryption and integrity checks over the loaded data, and finally relocate the newly loaded code to prepare it for execution. Another problem that exists, is the amount of temporary data required to perform the above operations, and a further problem that exists, is that systems with state information residing in a persistent memory such as EEPROM are required to ensure that this information stays consistent even in case of unexpected power losses and other failures.

A transition from one consistent system state to another may involve updates of several cells of persistent memory. These updates should be performed atomically, where either all memory cells are updated or none of them. The atomicity of several memory updates is supported by the so called "transaction model" in which the system can designate the beginning of an atomic set of updates by issuing the begin-of-transaction command. This command may be given explicitly or implicitly, i.e. be contained in the atomic set command itself. For instance primitive commands, like the data types "byte" and "short" have to be atomically updated and their mere appearance may serve as begin-of-transaction command. Each persistent memory cell is then updated only conditionally by a transaction support system. That means that a memory cell appears to be updated and reading that memory cell returns its latest conditional value, but the update is not yet committed, i.e. guaranteed to remain in a subsequent start of the system. To commit all performed updates, the transaction-commit command is used. When this operation returns, all updates are guaranteed to be written to the persistent memory. If power is lost or some other system failure occurs prior to the completion of the transaction-commit operation, all conditional updates are discarded.

The implementation of the transaction model is generally based on maintaining a transaction buffer, part of which is in the persistent memory. There are two different modes of operation of the transaction support system. One mode is to maintain in the transaction buffer information allowing restoration of the original state of the memory cells updated in a transaction. Before updating a memory cell in a transaction, the transaction support system stores, in the transaction buffer, the cell's address and the previous value of that cell. This information allows to roll-back to that previous value in case of failure. If power is lost during a transaction, the data stored in the transaction buffer is used to recreate the old system state when power supply is established again.

An alternative approach is to write to the transaction buffer the conditional values of updated memory cells and their address/location instead of the old values. The memory cells themselves keep their old values. When a value is read, the transaction support system first inspects the transaction buffer; if a conditional value of the selected memory cell is in the transaction buffer, this value is returned. If this technique is used, no action is required in case of failure since the persistent system memory is unchanged before the transaction commits. The transaction-commit operation writes the values stored in the transaction buffer to their destinations.

In a resource-constrained environment, such as a smartcard, the size of the transaction buffer is highly critical. The goal of the transaction support system is to make most effective use of the transaction buffer to allow a higher number of updates to be executed within one transaction. Writing persistent memory is time-consuming compared to reading. The other goal is to reduce the number of expensive write-operations to persistent storage needed for transaction support.

Therefore, it is an object of the invention to provide a method and a device for transactional writing of data into a data space in persistent memory using a persistent intermediate buffer with a minimum number of write-operations.

It is another object of the invention to have the consistency of transactional writing guaranteed using a small persistent intermediate buffer (also called a transaction buffer).

SUMMARY OF THE INVENTION

A memory management system supporting dynamic allocation of persistent memory, maintains in persistent memory, information about which blocks are allocated and which are free. This memory state information shall be updated under transaction-control to ensure its consistency. Memory state information is maintained for each memory object. If a new object is allocated in a transaction, memory state information is written to the transaction buffer. Only if the transaction commits, does the memory state information indicate that the memory allocation state is effective. Otherwise, the memory block is marked as free by the memory state information. The invention exploits the fact that the content of free memory is not critical to the system and can be changed arbitrarily.

One scenario is that an application requests the presence of an object, which requests leads to an allocation of the object. The persistent memory comprises allocated and free blocks, whereby an allocated block, called data space, consists of a header, referred to as data header, and a payload area. The data header holds information to be used for memory management. The payload area contains application data that is critical to the application, i.e. the application relies on the consistency of this data.

A free block consists of a data space header and a free area, also called a free data space. The data space header holds information to be used for memory management, namely to signal to the memory management system that this block is free, and to indicate the blocks size, garbage collection status, etc. The content of the free area is not critical to any application, which means that the content of this area is of invisible to and inaccessible by the application and can be changed arbitrarily. Only the memory management system knows that this area exists and it knows via the data space header that no application cares about the contents.

The memory with the above described characteristics could be e.g. an object heap of an object-based system which is located e.g. in an EEPROM, FlashRAM, or a disk storage.

To allocate a new object, comprising an object header and an object payload, the memory management system inspects free memory space. If a free memory block, i.e. data space, with sufficient size is found, that block is allocated. The allocation comprises writing into the memory cells of the data space header to make it an object header and mark it respectively. The writing into this header is performed under transaction-control to ensure consistency of the memory management information. Furthermore, the data space is filled with the object payload. After the allocation, the application gets access to the written object payload area.

For performing the transaction-control, the transaction support system maintains a transaction buffer, also referred to as persistent intermediate memory buffer, in which are stored either the old values, i.e. the values valid before the transaction, or the new values, also called conditional values, of the memory cells of the data space header modified in the transaction.

The object allocation and -initialization may also constitute a single transaction, to achieve that the system state, i.e. the fact if a memory block is free or allocated, is changed only if both the allocation and initialization succeed.

Another technique is to optimize the behavior of the transaction support system: When a memory cell of an object is updated, the transaction support system inspects the transaction buffer to check whether this cell belongs to an object allocated in a possible current transaction. This is the case if the header of the object to which the memory cell belongs is found in the transaction buffer. If the memory cell belongs to an object allocated in the current transaction, this cell can be updated directly in the persistent memory. No data has to be written to transaction buffer. This optimization is based on the fact that if the transaction is not committed, the memory management information is restored by the transaction support system. In that case the memory cells which were updated directly and cannot be restored would belong again to the free memory block whose content is not critical to the application.

The presented technique allows building a transaction support system making more effective use of the transaction buffer as well as to reduce the number of write-operations to persistent memory in a transaction. The technique can be used in any system which uses dynamic memory allocation, particularly in any object-based system supporting dynamic object creation, as for instance Java.

When newly allocated objects are initialized, this initialization often affects most of the object items and is typically performed in a transaction. For many applications the initialization phase is the most critical in terms of transaction buffer requirements. Using the proposed technique, the transaction buffer requirements and the number of write-operations needed for initialization of newly allocated objects can be reduced to the minimum.

The proposed solution avoids costly write-operations to the transaction buffer for initialization of objects allocated in a transaction. The number of updates during the initialization is not limited by the size of the transaction buffer. Objects whose size exceeds the size of the transaction buffer can be initialized.

No additional action is needed to ensure that the persistent memory contains only objects which are complete, since the data space header, which is the header that identifies its associated data space as free, remains in the persistent memory during the transactional writing of the data.

The persistent intermediate buffer serves for intermediately storing validity information for ensuring the validity of the data header and the data space header. The validity information for substituting the data space header by the data header after successful completion of the transactional writing of the data, represents a straightforward and easy-to-implement operation because the whole data space header is substituted and no additional action is necessary to write the new data header in its position. This solution is also very fast and due to possible redundant information present in both headers provides a possibility for error-checking.

When the validity information comprises the whole data header generated in the persistent intermediate buffer means, again a speed advantage is achieved, because the whole information needed for updating the persistent memory, namely the header, is already present, such that eventual time-consuming operations for obtaining the data header are not needed.

When the data header is generated in the persistent memory during the transactional writing of the data, in case of committing transactional writing, no additional action is needed to ensure that the persistent memory contains only objects which are complete.

To have the validity information substitute the data header for the data space header after nonsuccessful completion of the transactional writing of the data, represents also a straightforward and easy-to-implement solution because the whole data header is substituted and no additional action is necessary to write the former data space header in its position. This solution is hence also very fast and due to a possible redundant information present in both headers provides a possibility for error-checking.

A speed advantage is achieved, when the validity information comprises the data space header which before the transactional writing is written to the persistent intermediate buffer means, because the whole information needed for reconstructing the data space header in the persistent memory, namely the data space header itself, is already present, such that eventual time-consuming operations for obtaining the data space header are not needed.

When during the transactional writing, an operation is performed which involves at least part of the data being written by the transaction, and which results in a modification outside of said data, that modification is buffered in the persistent intermediate buffer until successful completion of the transactional writing of the data. This is to insure that modifications in the persistent memory are only performed when the transactional writing is successful.

When part of the data header is generated in the persistent memory and the transactional writing is not successfully completed, the data space header is restored in the persistent memory and the validity information comprises the part of the data space header necessary therefor, an optimization can be achieved, in that only the data part that is different between the two headers need be stored intermediately without loosing the possibility to ensure that the correct header is present at any time.

When the validity information comprises link information to at least one place where at least part of the data header and/or the data space header is located, the intermediately stored information can be reduced to a minimum, since this information can comprise a simple pointer, which needs less bytes than the entire header.

The invention is particularly useful for an environment where the data is written from a non-persistent memory which has a short write-access-time, such as a RAM and where the persistent memory has a longer write-access-time, such as EEPROM, because in such an environment, the number of write cycles should be minimized, since they are slow. Any obsolete writing or reading step is hence a waste of precious time and leads to slow-down of an application waiting for an object to be allocated.

DESCRIPTION OF THE DRAWINGS

Examples of the invention are depicted in the drawings and described in detail below by way of example. It is shown in FIG. 1 a schematic view of an arrangement comprising a RAM and a persistent memory.

The FIGURE is for sake of clarity not shown in real dimensions, nor are the relations between the dimensions shown in a realistic scale.

DETAILED DESCRIPTION OF THE INVENTION

Figure 1:
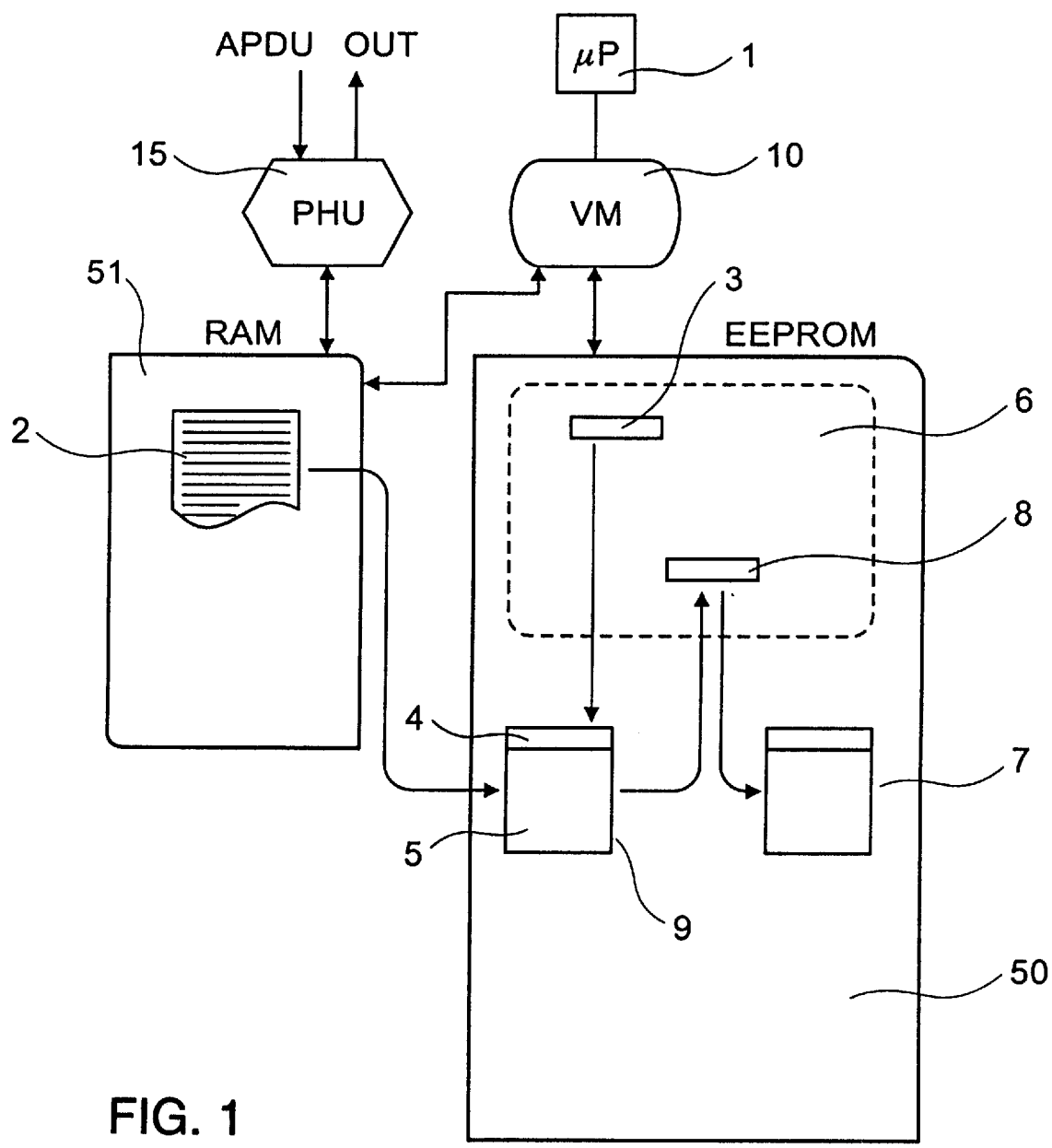

In the only FIG. 1 an arrangement is depicted in which a microprocessor $\mu$P 1 runs a virtual machine 10 which is connected to a first memory 51, which is random access memory (RAM) with a short write-access time; and a second memory 50 which is an EEPROM that has a relatively longer write-access time. The RAM 51 is also connected to a protocol-handling unit (PHU) 15 which handles traffic arriving, APDU, and leaving, OUT. Herein, the depicted arrangement is integrated on a smartcard.

The PHU 15 serves as a means for loading data 2 to the non-persistent memory 51 and the VM 10. Furthermore, it serves as a means for transactional writing of the data 2 from the non-persistent memory 51 to the persistent memory 50. This transactional writing makes use of a transaction support system which is part of the VM 10.

The above arrangement is contained in a resource-constrained environment of a smartcard. The constraints exist mainly in the size of the RAM 51 and the EEPROM 50. However, constraints also occur due to weak computing power which is relevant to cryptography; narrow bus width, which is relevant to intercommunication speed; short clock cycles which lead to small inter-component communication speed and low processing speed; and a slow write-time to the EEPROM 50.

The part of the virtual machine which performs the function of obtaining only valid results of transactional writing in the buffer 6 is also called a transaction support system and is a means for ensuring writing the data in atomic, durable and consistent form.

The data 2 is loaded in to the RAM 51 through the PHU 15. This data 2 may comprise instruction codes. The RAM 51 is smaller than the EEPROM 50 so that the data 2 is transmitted in segments from the RAM 51 to the EEPROM 50. The loading between the memories 50, 51 is done using a transaction-subsystem (also referred to as a transaction support system) resident in the virtual machine 10. This subsystem ensures integrity of the EEPROM 50 in case of errors occurring during the loading, linking and installation of new code on the smartcard.

Decryption and integrity check can preferably be done by a coprocessor, while the loading and linking is preferably done by the microprocessor $\mu$P 1.

In the EEPROM 50, a particular area is reserved as a persistent intermediate buffer 6, here simply referred to as buffer 6. In the persistent memory 50, a data space 5 is present which accepts a data space header 4.

Various methods are now described of ensuring consistency for the transactional writing of a first object 9 in the persistent memory 50.

When the data 2 is to be written into the data space 5 in form of the first persistent object 9, a new header, which here is an object header 3, or also data header 3, is created. The data header 3 is here not immediately written into the position of the data space header 4 but is stored in the buffer 6. However, the data 2 is written directly into the data space 5. A sudden power down or any other source of interruption or transactional writing occurring at this time results in the object 9 having no valid object header 4 and thus, the data space is still not allocated to object 9 but is still marked as a free memory area visible only to the memory management system, which is generally a mechanism or arrangement for keeping an overview over the memory occupance. The data space 5, although being at least partly filled with the data 2, is hence treated as if it were still free. When all data 2 has been written into the data space 5, the intermediately stored data header 3 is read from the buffer 6 and written over the data space header 4, thereby finally defining the former empty data space 5 as meaningful object payload of the allocated first object 9. This writing procedure can be repeated for any object, and is changed to a transaction recovery procedure when power fails.

The transaction recovery procedure relies on the existence of a piece of information which declares whether a transaction has committed or not. This piece of information can be a transaction-buffer-valid bit which, when set to 1, signals that the buffer 6 contains data to be used for transaction completion, i.e. needs to be written to the persistent memory 50, and when reset to 0, signals that the buffer 6 contains no valid information, as far as the transaction support system is concerned. This transaction-buffer-valid bit is written to the buffer 6 where it is safe in case of a power down condition. Upon power-up, the transaction support system performs the transaction recovery procedure which starts with reading the transaction-buffer-valid bit. Generally with this it is determined, whether the buffer 6 contains valid data, i.e. headers and/or other data. Then the procedure copies all valid data from the buffer 6 to the persistent memory 50. Finally the transaction-buffer-valid bit is reset to "invalid".

Since the object header 3 was written to the buffer 6, the buffer content is to be used to update the persistent memory 50. The set transaction-buffer-valid bit hence signals that the buffer content is valid. After updating the persistent memory using the buffer content, the transaction-buffer-valid bit is reset to 0.

A mechanism similar to that for the headers 3, 4 is used for operations which involve the payload of the first object 9 that has just been allocated during the transaction. Until the transactional writing of the first object 9 is terminated successfully, there is danger of a non-successful termination. Any operation involving the data 2 or code in this payload and leading to a modification somewhere outside of the first object 9, has to be guaranteed that the transaction is successfully terminated, i.e. commits. To achieve this, the operation on code 2 also uses the buffer 6. For instance, if part of the code 2 in this first object 9 is to be modified, the modification is buffered in the buffer 6 and only executed, when the transaction commits. On the other hand, if code in the currently written first object 9 is to be amended, this can happen directly in this first object 9 because in the case of failure this amendment is not valid. This case can be detected by the transaction support system through the existence of the data space header 4 or the data header 3.

In FIG. 1, a piece of code is to be transferred from the first object 9 to a second object 7 residing in the persistent memory 50. This operation will be executed only when the transactional writing is successful allocating the first object 9 completely. Therefore, the code 8 to be transferred, is buffered in the buffer 6. After completion of the transactional writing, the buffered code 8 is then transferred from the buffer 6 to the second object 7. In the case of a failure before the transactional writing has been confirmed as committed, the content of the buffer 6 will not be used. This leaves the non-allocated first object 9 and a non-modified second object 7 unchanged as if nothing happened. Upon power-up, a new attempt may be started to "atomically" allocate the first object correctly. If the transaction then commits, the transaction-buffer-valid bit indicates that the buffer content may be used to finish the transactional writing by updating the persistent memory content.

When a memory cell of one of the objects 7, 9 in the persistent memory 50 is to be updated, the transaction support system inspects the transaction buffer 6 to check whether this memory cell belongs to the object 9 allocated in a possible current transaction. When the data space header 4 of the object to which the memory cell belongs is found in the transaction buffer, it is clear that this object has indeed been created in the current transaction. Then this cell can be updated directly in the persistent memory. No data has to be written to the transaction buffer 6. This optimization is based on the fact that if the transaction is not committed, the memory management information is restored by the transaction support system. In that case, the memory cells which were updated directly and cannot be restored would belong again to the free memory block whose content is not critical to the application. The same is applicable for the method in which the data header is stored in the buffer 6 or for mixed versions thereof.

For objects that reside in the persistent storage but which are not being allocated in the current transaction, the application will find no header in the buffer 6. In this case, the modification is stored in the buffer to ensure no complications in the case of transaction failure.

One example for the sensitivity of transactions to the principle of atomicity is the handling of cash functions with a smartcard. Imagining the transferal of a specific amount of cash from one account to another, each account being represented by an object in the persistent memory 50. A non-transactional writing or non-atomic transactional writing could result in an intermediate state, where the amount has already been deducted from one account but not been added to the other account. Simply said, the amount is lost. There would be no technical way to reconstruct the situation before the failing transaction or to arrive at the desired result, as long as there is no transaction buffer. With the above described method, the buffer needs only store the header of the object and eventually some code to be operated on.

Various modifications of the described method are possible. For instance, it is possible to store the data space header 4 in the buffers and to write the data header 3 directly into the persistent memory 50. With this procedure, in case of a committing transaction, the buffer 6 need not be used.

The transaction recovery procedure is here also used the other way round: In the case of a committing transactional writing, the buffer content is invalid and not to be used anymore. Hence, this invalidity is signaled by the respective setting of the transaction-buffer-valid bit. Here, it may be reset to 0 in case of successful writing and set to 1 in case of failure.

The choice between the one or the other method can depend on how much time is to be used for either recovery or successful completion of the transaction. If recovery is desired to be as quick as possible, the first described method is the preferred choice.

The intermediately stored information in the buffer 6, which is either the data space header 4 or the data header 3, ensures that the correct handling of the respective object or data space is achieved.

The decision, where header 3 or 4 is written, is controlled by the transaction support system of the virtual machine 10. As long as no failure occurs, the transaction support system operates such that the first object 9 and eventual further objects are allocated correctly. The default mechanism in the case of a committing transaction is to either write the object header 3 from the buffer 6 over the data space header 4 or to delete the data space header 4 if it resides in the buffer 6. In the startup routine, i.e. after a power-up, the persistent buffer 6 is treated according to the transaction-buffer-valid bit. In the case, it is invalid, the buffer 6 is emptied which leads to loss of the intermediately stored header 3 or 4.

Also mixed forms of the above described two methods are possible, i.e. writing neither the data space header 3 nor the data header 4 into the buffer 6 but any kind of validity information that is suited to either reconstruct the data space header 4 or to establish the new data header 3. This validity information can comprise only the bits or bytes which differ between the two headers 3 and 4.

When several objects are to be allocated, only one data space header 4 might be needed to be stored in the buffer 6 having two pointers to the respective data spaces. Also instead of storing something in the buffer 6, it can be located somewhere else, e.g. in the persistent memory 50 being referred to by a link information, such as a pointer, which is then stored in the buffer 6, hence being some form of indirect addressing. Also here any mixed form of direct storing in the buffer 6 and storing at some other location is possible.

According to the state of the art, on a smartcard, except for some special data, all information is loaded into the RAM first and from there to the EEPROM. This is done due to the fact that on a smartcard the RAM is much faster than the EEPROM.

In the case some data is encrypted, a decryption operation follows. For that, the code is piecewise reloaded to the RAM where a decryption is conducted and the decrypted code is reloaded to the EEPROM. In case an integrity check is to be done, the code is reloaded piecewise to the RAM and the integrity check is performed, resulting in an integrity check vector that signals if the code has passed the check or not. Then a linking procedure follows which again can only be performed in the RAM. Since the encryption, integrity-check and linking can be performed piecewise, i.e. for only a part of the loaded code, one part following the other, all operations can be done right after loading the respective part to the RAM 51 and then loading the decrypted, integrity-verified and linked code to the EEPROM 50.

Therefore, it should be understood that this invention is not limited to the described embodiments thereof but should be determined by the spirit and scope of the appended claims.

What is claimed is:

1. A method for transactional writing of data into a data space in a persistent memory having persistent buffer, said method comprising the steps of:
   a) providing in said persistent memory a data space header which signals that said data space is free;
   b) generating a data header which after successful completion of said transactional writing, signals that said data space is occupied by said written data;
   c) using the persistent buffer for storing validity information in connection with at least one of the headers;
   d) writing said data directly to said persistent memory; and when transactional writing is not successfully completed, ensuring that said data space header is valid for said data space, and when said transactional writing is successfully completed, ensuring that said data header is valid for said written data in said data space, whereby said persistent intermediate buffer serves for storing validity information for said data header.

2. The method according to claim 1, including the step of having the data space header remain in the persistent memory during the transactional writing of the data.

3. The method according to claim 2, including the step of having the validity information substitute the data header for the data space header after successful completion of said transactional writing of said data.

4. The method according to claim 3, wherein the validity information comprises the data header which is generated in the persistent buffer.

5. The method according to claim 1, including the step of generating the data header in the persistent memory during the transactional writing of the data.

6. The method according to claim 5, wherein the validity information serves for substituting the data space header for the data space header in case said transactional writing is not successfully completed.

7. The method according to claim 6, wherein the validity information comprises the data space header and is written to the persistent buffer before the transactional writing.

8. The method according to claim 1, including the step of buffering in said persistent storage a modification, which involve at least part of the written data, until successful completion of the transactional writing of the data.

9. The method according to claim 1, including the step of generating at least part of the data header during transactional writing in the persistent memory and when said transactional writing is not successfully completed restoring said data space header in the persistent memory.

10. The method according to claim 1, wherein the validity information comprises link information to at least one place where at least part of the data header and/or the data space header is located.

11. The method according to claim 1, including the step of writing the data from a non-persistent memory which has a short write-access-time, such as that of RAM to that of the persistent memory and persistent buffer have a longer write-access-time, such as that of an EEPROM.

12. A method according to claim 1, wherein the data comprises instruction code which is loaded into the non-persistent memory in an encrypted form and/or with integrity check information and that said instruction codes are decrypted and/or checked upon their integrity in said non-persistent memory.

13. A device with a persistent memory and a persistent buffer comprising:
   a) a data space header which signals that a data space in the persistent memory is free;
   b) a data header generator for generating a data header for data to be written into said data space, which data header after successful completion of transactional writing of said data, signals that said data space is occupied by said written data;
   c) a mechanism for writing said data directly to said persistent memory, and indicia in said persistent buffer storing validity information in connection with at least one of the headers which insures that the data space header is valid in the case said transactional writing is not successfully completed, and insures that the data header is valid in the case said transactional writing is successfully completed, whereby said persistent intermediate buffer serves for intermediately storing validity information for ensuring said validity of said data.

14. The device according to claim 13, further comprising a non-persistent memory and loading means for loading the data to said non-persistent memory and writing means for writing said data from the non-persistent memory to the persistent memory.

15. The device according to claim 14, characterized in that the first memory is a RAM with a short write-access-time, and that said persistent memory is an EEPROM that has a longer write-access-time.

16. The device according to claim 12, characterized in that it is embodied in a smartcard, particularly a Javacard.

17. A software product for use with a processor for transactional writing of data into a data space in a persistent memory having persistent buffer, said software product comprising the steps of:
   a) software code for providing in said persistent memory a data space header which signals that said data space is free;
   b) software code for generating a data header which after successful completion of said transactional writing, signals that said data space is occupied by said written data;
   c) software code for using the persistent buffer for storing validity information in connection with at least one of the headers;
   d) software code for writing said data directly to said persistent memory; and when transactional writing is not successfully completed, ensuring that said data space header is valid for said data space, and when said transactional writing is successfully completed, ensuring that said data header is valid for said written data in said data space, whereby said persistent intermediate buffer serves for storing validity information for said data header.

18. The software product according to claim 17, including the step of having the data space header remain in the persistent memory during the transactional writing of the data.

19. The software product according to claim 18, including the step of having the validity information substitute the data header for the data space header after successful completion of said transactional writing of said data.

20. The software product according to claim 19, wherein the validity information comprises the data header which is generated in the persistent buffer.

21. The software product according to claim 17, including software for generating the data header in the persistent memory during the transactional writing of the data.

22. The software product according to claim 21, wherein the validity information serves for substituting the data space header for the data space header in case said transactional writing is not successfully completed.

23. The software product according to claim 22, wherein the validity information comprises the data space header and is written to the persistent buffer before the transactional writing.

24. The software product according to claim 17, including software for buffering in said persistent storage a modification, which involves at least part of the written data, until successful completion of the transactional writing of the data.

25. The software product according to claim 17, including software for generating at least part of the data header during transactional writing in the persistent memory and when said transactional writing is not successfully completed restoring said data space header in the persistent memory.

26. The software product according to claim 17, wherein the validity information comprises link information to at least one place where at least part of the data header and/or the data space header is located.

27. The software product according to claim 17, including software for writing the data from a non-persistent memory which has a short write-access-time, such as that of RAM to that of the persistent memory and persistent buffer which have a longer write-access-time, such as that of an EEPROM.

* * * * *